United States Patent [19]

Gordiski et al.

[11] 4,371,941

[45] Feb. 1, 1983

[54] CONTROL APPARATUS FOR ROLL GRINDERS

[75] Inventors: Ronald J. Gordiski, Ansonia; Robert G. Bennett, Jr., Seymour; Alfred T. Parrella, Newtown; Michael Bagnall, Southbury, all of Conn.

[73] Assignee: USM Corporation, Farmington, Conn.

[21] Appl. No.: 108,338

[22] Filed: Dec. 31, 1979

[51] Int. Cl.³ .................. G05B 19/18; G06F 15/46
[52] U.S. Cl. ..................... 364/475; 51/165.71; 318/571
[58] Field of Search ........ 364/474, 475, 120, 167–171; 318/571; 51/165.71, 165.74, 165.75, 165.76; 408/10–13

[56] References Cited

U.S. PATENT DOCUMENTS

| 3,372,322 | 3/1968 | Lockwood et al. ........... 318/571 X |
| 3,811,228 | 5/1974 | Nagashima et al. ........ 51/165.71 X |
| 3,919,614 | 11/1975 | Wespi ..................... 318/571 |
| 3,934,185 | 1/1976 | Schoonover et al. ........ 318/571 X |
| 4,136,390 | 1/1979 | Farrell et al. ................ 364/474 |

FOREIGN PATENT DOCUMENTS

| 1455746 | 11/1976 | United Kingdom ............... 318/571 |
| 1468075 | 3/1977 | United Kingdom ............... 364/475 |
| 1500031 | 2/1978 | United Kingdom ............... 364/475 |
| 1532067 | 11/1978 | United Kingdom ............... 364/475 |

*Primary Examiner*—Joseph F. Ruggiero
*Attorney, Agent, or Firm*—William F. White

[57] ABSTRACT

A digital control system is provided for positioning a tool relative to a workpiece. The tool is preferably a grinding wheel and the workpiece is a roll appropriately mounted within a roll grinding machine. The digital control system receives various infeed commands representative of the different types of infeed positioning that are to be performed during a grinding operation. The digital control system is thereafter operative to combine these infeed commands into a composite set of control signals. These control signals are applied to a single motor within a pivotal infeed arrangement which moves the grinding wheel relative to the workpiece.

46 Claims, 8 Drawing Figures

CONTROL APPARATUS FOR ROLL GRINDERS

FIELD OF THE INVENTION

This invention relates to the automatic control of roll grinders. In particular, this invention relates to the automatic control of the infeed motion of one or more grinding wheels within a roll grinding machine.

BACKGROUND OF THE INVENTION

Machines which grind the surface of a roll to within very close dimensional tolerances are generally known as roll grinding machines. These machines are capable of defining particular contours such as the well-known crown contour along the length of the roll. To achieve these ends, roll grinding machines employ sophisticated mechanisms which position the grinding tool relative to the workpiece roll. These mechanisms include an infeed device which moves the grinding wheel toward the workpiece until a predefined grinding depth has been reached.

The systems employed in the past to move the grinding wheel have usually consisted of complex mechanical arrangements. The complexity of these mechanical arrangements has often been attributable to the number of different types of infeed that may be necessary during a roll grinding operation. For instance, the mechanical infeed arrangements may be called upon to implement several different types of infeed either simultaneously or selectively while proceeding along the length of the workpiece. These types of infeed may be required in conjunction with the overall grinding profile that is to be accomplished. This has necessarily led to rather complex mechanical arrangements that are capable of responding to all these various possibilities. This has in turn often led to the deployment of a number of different motors to perform specified types of infeed. The motors are usually accommodated within the mechanical arrangements in such a manner so as to compound or superimpose their separate drive functions.

The motors have also had their separate and individual controls associated therewith. These controls have usually been only responsive to one or two different types of infeed commands. The separately dedicated control systems have for the most part not been interrelated. In other words, there has heretofore not been a single motor control system which has been capable of implementing all types of infeed commands which may be necessary in a roll grinding application.

OBJECTS OF THE INVENTION

It is an object of this invention to provide a roll grinding machine with a new and improved electronic control system.

It is another object of this invention to provide a roll grinding machine with an electronic control system which generates a composite set of signals for all infeed functions.

It is still another object of this invention to provide a roll grinding machine with an automatic control system which simultaneously defines and controls a number of separate infeed functions.

It is a still object of this invention to provide a roll grinding machine with an electronic control system which controls a single motorized drive that performs all infeed functions.

SUMMARY OF THE INVENTION

The above and other objects of the invention are achieved by providing a roll grinding machine with a digital control system which controls a number of different infeed functions. The digital control system receives various infeed commands representative of the different infeed functions that are to be performed by the roll grinding machine. The digital control system is thereafter operative to combine these infeed commands into a single set of control signals. These control signals are applied to a single motor within a pivotal infeed arrangement which moves the grinding tool relative to the workpiece.

A number of different subsystems are included within the aforementioned digital control system. In particular, a separate subsystem defines the grinding pattern or profile that is to be executed along the length of the workpiece roll. Two additional subsystems each define forward and reverse infeed functions that are to occur from time to time during the execution of the pattern or profile grinding. These forward and reverse infeed functions occur when particular circuitry is activated within these two additional subsystems. The digital control system furthermore includes a separate fixed distance retract circuit and a separate load control circuit. These latter circuits are also individually activated when the particular function is so desired.

BRIEF DESCRIPTION OF THE DRAWINGS

The above and other features of the invention will now be particularly described with reference to the accompanying drawings, in which.

DESCRIPTION OF THE PREFERRED EMBODIMENT

Figure 1A:
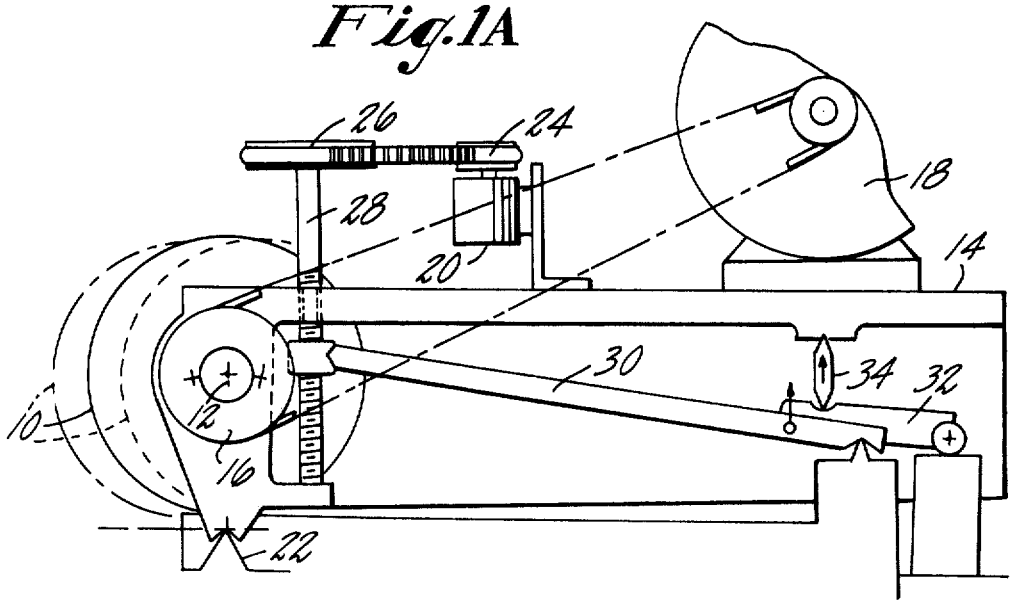
FIGS. 1A and 1B are illustrations of a pivotal infeed arrangement having a single motorized drive for moving the grinding tool relative to the workpiece.

Referring to FIG. 1A, a schematic showing of a pivotal infeed arrangement for a grinding wheel 10 is illustrated. The tilting motion of the grinding wheel 10 is depicted by several dotted outline positions of the wheel. It is to be understood that these positions represent respective inward and outward positions of the grinding wheel relative to a workpiece which is not shown. It is to be furthermore understood that the pivotal arrangement of FIG. 1A is preferably mounted on a carriage in a conventional manner within a roll grinding machine. In this regard, the carriage traverses the length of the workpiece which is normally a rotatably mounted calendar roll within the roll grinding machine.

The amount of inward or outward positioning of the grinding wheel relative to the calendar roll dictates the degree of grinding along the length of the roll.

Figure 1B:
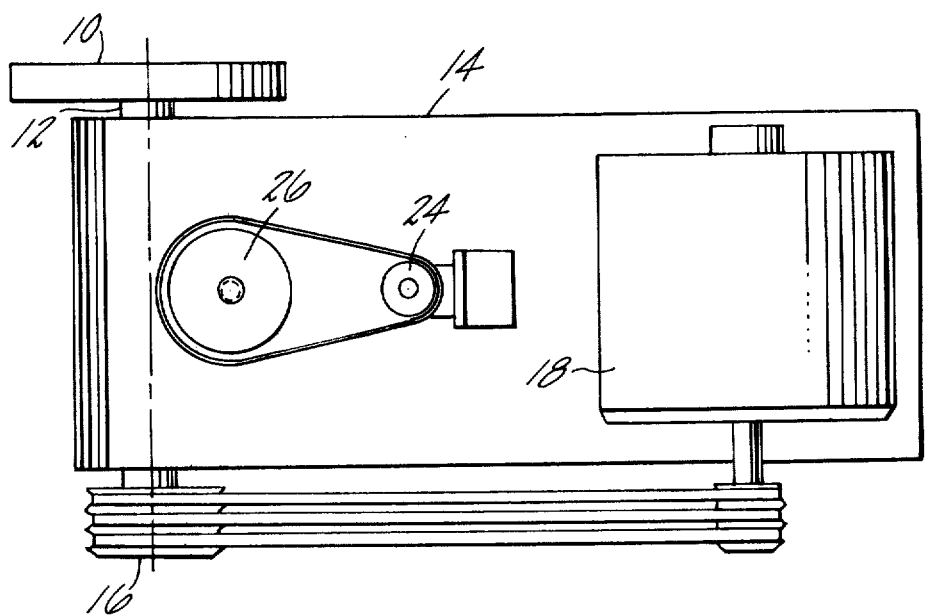

Referring now to FIG. 1B, the grinding wheel 10 is further illustrated in a top view of the pivotal infeed arrangement. The grinding wheel 10 is seen to be affixed to a shaft 12 which is rotatably mounted within a platform 14. A pulley 16, mounted on the opposite end of the shaft 12, is belt driven by a grinding wheel motor 18. The wheel motor 18 is preferably a variable speed motor having the capability of driving the grinding wheel 10 at different speeds as may be required during the course of various grinding operations.

Referring now to FIG. 1A, it is seen that an infeed motor 20 is mounted to the top of the platform 14. The infeed motor 20 is also a variable speed motor capable of defining variable infeed rates of the grinding wheel 10 relative to the workpiece. This infeed is accomplished by pivoting the platform 14 about a fulcrum point 22 so as to thereby define inward or outward movement of the grinding wheel 10 relative to the workpiece.

The output shaft of the infeed motor 20 is connected to a pulley drive arrangement comprising a set of pulleys 24 and 26 which turn a ball screw 28. The rotation of the ball screw 28 causes a feed lever 30 to move vertically upward or downward which in turn causes a pivotally connected lever 32 to move vertically. The vertical motion of the lever 32 is imparted to the platform 14 via a free-standing vertical member 34. The result is that an upward motion of the feed lever 30 will produce a pivotal motion of the platform 14 about the fulcrum point 22 so as to produce an infeed of the grinding wheel 10 with respect to the workpiece. On the other hand, a reversal of the infeed motor 20 will cause the feed lever 30 to move downwardly so as to thereby pivot the platform 14 clockwise about the fulcrum point 22 so as to thereby retract the grinding wheel 10 from the workpiece.

Figure 2:
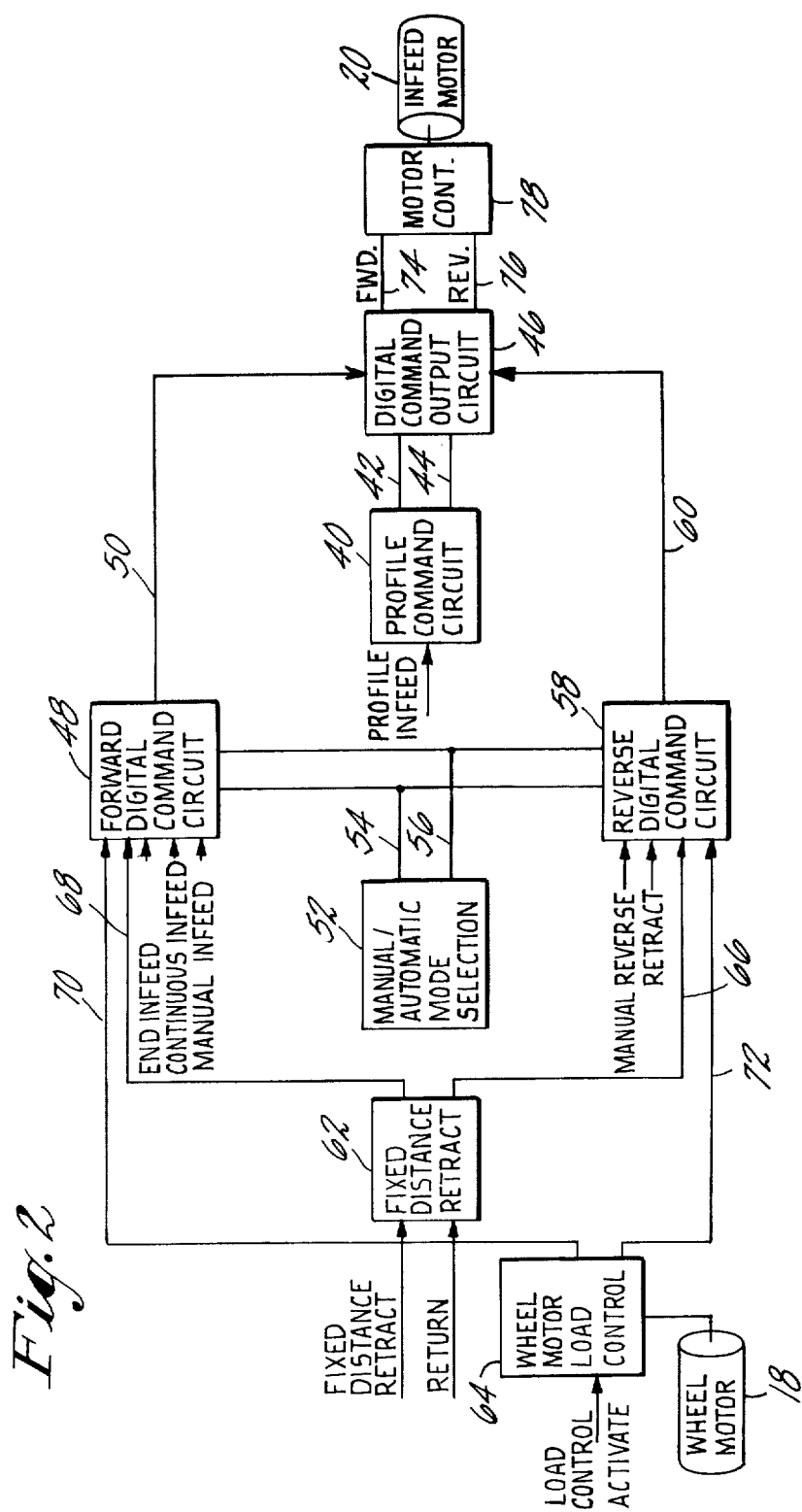
FIG. 2 is a block diagram of a digital control system for the single motorized drive.

Referring to FIG. 2, a control system for the pivotal infeed arrangement of FIGS. 1A and 1B is illustrated in block diagram form. The control system is seen to interface with the wheel motor 18 and the infeed motor 20 of the pivotal infeed arrangement. As will become apparent hereinafter, the control system of FIG. 2 operatively controls the infeed motor 20 in response to various external infeed commands which are applied thereto. This control will include in one instance, the operative monitoring of the motor load condition present on the wheel motor 18.

The various external infeed commands which are applied to the control system are: profile infeed, end infeed, continuous infeed, manual infeed, manual reverse, retract, fixed distance retract, return, and load control activate. It is to be understood that each of these external commands defines a specific type of infeed that is to be performed. The commands may be either separately or conjunctively commanded by activation of switches within the particular command circuits. These switches can be manually activated by an operator, or, in the alternative, they could be activated automatically by a higher order control system.

A profile command circuit 40 is responsive to a switch activation indicated as a profile infeed. The profile command circuit is thereafter operative to produce pulses on either of a pair of output lines 42 and 44. As will be explained in detail hereinafter, the pulses appearing on the output line 42 will be interpreted as a forward profile command whereas the pulses appearing on the output line 44 will be interpreted as a reverse profile command. The pulses present on the lines 42 and 44 are applied to a digital command output circuit 46 which is operative to appropriately interpret these pulses.

In addition to receiving the profile command pulses on the lines 42 and 44, the digital command output circuit 46 also receives certain other forward and reverse command pulses. In particular, a forward digital command circuit 48 is operative to generate pulses on a line 50 in response to various activated infeed commands. These commands include an end infeed, a continuous infeed, and a manual infeed. The end infeed command is activated at each end of the workpiece roll so as to initiate a fresh cut. The continuous infeed is normally activated during the entire grinding operation so as to bias the grinding wheel toward the workpiece roll at a preset uniform rate so as to thereby compensate for wear of the grinding wheel. The manual infeed is a discretionary operator command which overrides the other forward infeed commands. The manual infeed override is accomplished by first selecting the manual mode of operation through a manual/automatic mode selection circuit 52. The manual/automatic mode selection circuit will generate a logically high signal on a line 54 and a logically low signal on a line 56 indicating the selection of a manual mode of operation. The signal levels will be reversed for the selection of an automatic mode of operation. As will be explained in detail hereinafter, the internal logic within the forward digital command circuit 48 is responsive to the signals present on the lines 54 and 56 so as to be in the proper mode of operation.

The manual and automatic signal indications on the lines 54 and 56 are also applied to a reverse digital command circuit 58. The reverse digital command circuit 58 furthermore receives certain external commands denoted as manual reverse and retract. The manual reverse merely allows the operator to intervene in an override fashion and arbitrarily reverse the infeed motion of the grinding wheel. The retract command is a rapid and total removal of the grinding wheel from the workpiece during an automatic mode of operation. As has been previously discussed with regard to the forward digital command circuit 48, the internal logic of the reverse digital command circuit 58 will be responsive to the signals present on the lines 54 and 56 so as to be in the proper mode of operation. The reverse digital command circuit is in each instance operative to generate a train of reverse command pulses on a line 60. These reverse command pulses on the line 60 are applied to the digital command output circuit 46.

In addition to executing the aforementioned external infeed commands, the forward digital command circuit 48 and the reverse digital command circuit 58 also receive infeed command signals from a fixed distance retract command circuit 62 and a wheel motor load control circuit 64. These circuits define particular infeed functions which will now be separately explained.

The fixed distance retract circuit 62 is operative to withdraw the grinding wheel a fixed and exact distance from the workpiece roll in response to the activation of a fixed distance retract switch. The fixed distance retract circuit 62 is also operative to return the grinding wheel to the same grinding point in response to the activation of a return input switch. The commanded retract is applied to the reverse digital command circuit 58 via a line 66 whereas the commanded return is applied to the forward digital command circuit 48 via a line 68.

The wheel motor control circuit 64 is operative to maintain a given load condition on the grinding wheel motor in response to the activation of a load control activate switch. As will be explained in detail hereinafter, the wheel motor load control circuit 64 accomplishes this objective by producing trains of pulses of varying frequency on either a line 70 to the forward digital command or on a line 72 to the reverse digital command circuit 58. The trains of pulses combine with any other commanded infeeds so as to define the desired load condition on the wheel motor 18.

Referring now to the digital command output circuit 46, it will be remembered that this circuit receives forward profile command pulses on the line 42 and forward command pulses on the line 50. The digital command output circuit 46 furthermore receives reverse profile command pulses on the line 44 as well as reverse command pulses on the line 60. The digital command output circuit is operative to generate a forward control signal pulse on a line 74 in response to receiving a pulse on either the line 42 or the line 50. The digital command output circuit 46 is also operative to generate a reverse control signal pulse on a line 76 in response to receiving a pulse on either the line 44 or the line 60. These pulses are applied to a motor control 78 which in turn controls the infeed motor 20. It is to be noted that the motor control 78 represents a standard interface for receiving control signal pulses over two different lines. The infeed motor 20 is subsequently operative to implement a forward infeed motion of the grinding wheel 10 in FIG. 1A in response to forward control signal pulses on the line 74. The infeed motor 20 is also operative to implement a reverse motion of the grinding wheel 10 in response to reverse control signal pulses occurring on the line 76.

It is to be noted that the infeed motor 20 and the motor control 78 are available in standard configurations from companies such as Superior Electric of Bristol, Connecticut and Aerotech Inc. of Pittsburgh, Penn. The motor controls offered by these companies are capable of receiving and processing pulses received on two lines such as 74 and 76.

Figure 3:
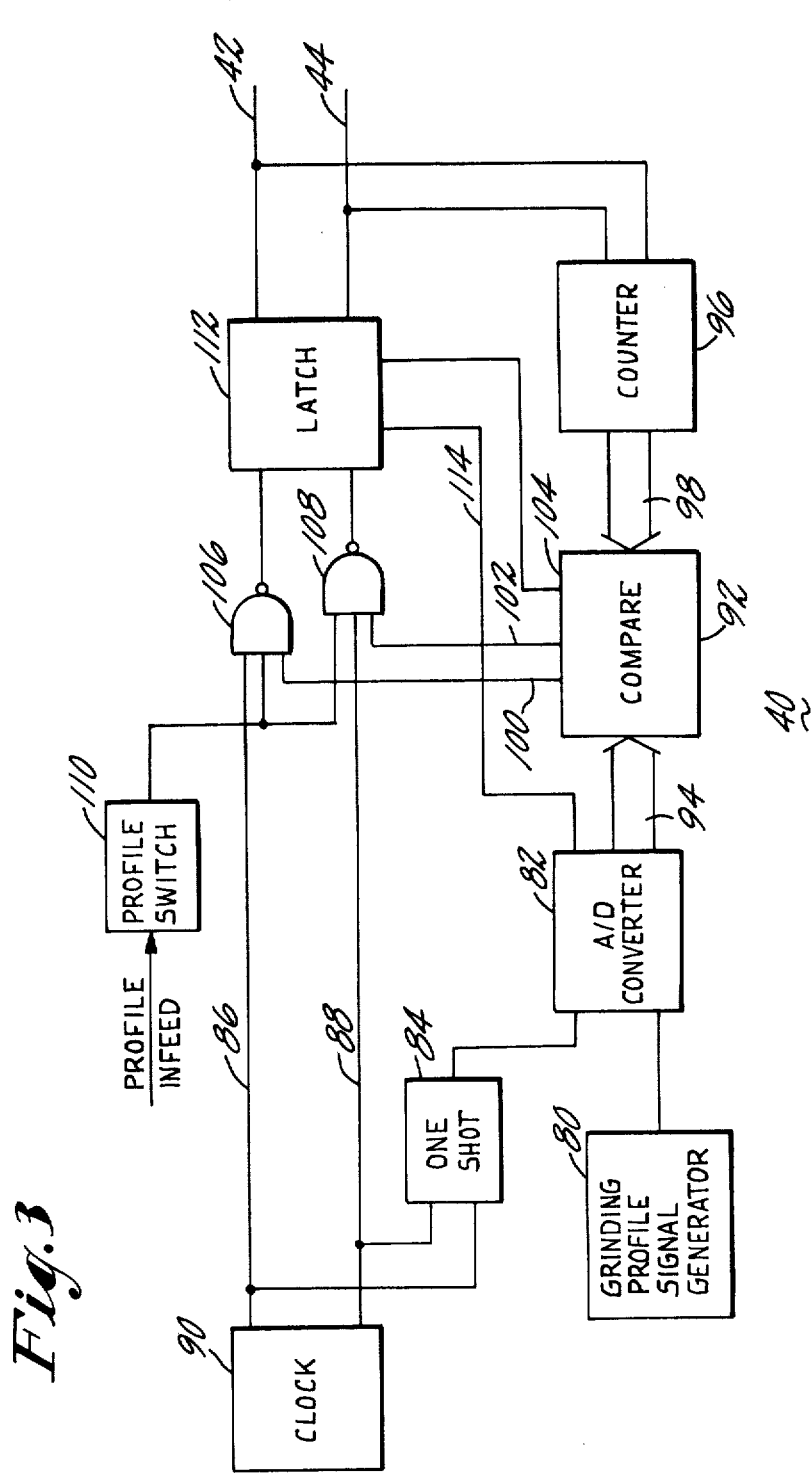
FIG. 3 is a detailed illustration of a grinding profile command circuit present within the digital control system of FIG. 2.

Referring now to FIG. 3, the profile command circuit 40 is illustrated in detail. The circuit includes a grinding profile signal generator 80 which is operative to produce an analog signal. The analog signal is preferably a DC voltage which varies in accordance with the amount of grinding that is to be accomplished along the length of the workpiece roll. The generation of the DC voltage is synchronized with respect to the movement of the grinding wheel 10 along the length of the workpiece roll. In this manner, the amount of infeed necessary to produce the particular grinding profile is defined along the length of the workpiece roll. It is to be noted that this type of analog signal generation is conventional and well known in the art.

Figure 4:
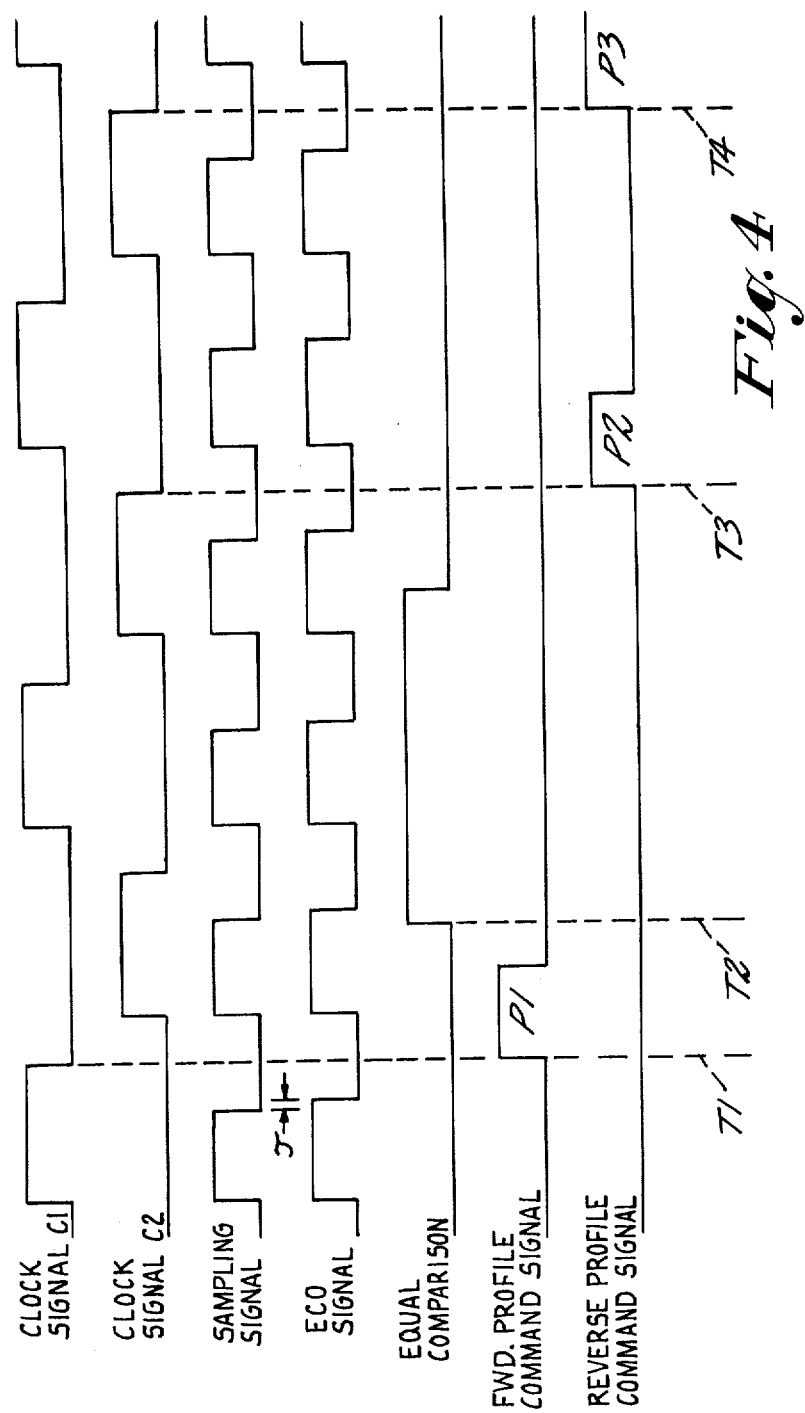
FIG. 4 is a timing diagram illustrating various signals present within the digital logic of FIG. 3.

The analog signal that is thus produced by the grinding profile signal generator 80 is applied to an analog to digital converter 82 (hereinafter referred to as an AD/-converter). The A/D converter 82 is operative to sample and digitize the analog signal each time a sampling pulse is received from a one-shot circuit 84. The one-shot circuit 84 is in turn activated by a pair of non-overlapping clock signals present on a pair of lines 86 and 88. These clock signals are generated by a clock circuit 90. The non-overlapping clocking signals are illustrated as clock signals C1 and C2 in FIG. 4. Clock signal C1 is present on the line 86 whereas clock signal C2 is present on the line 88. It is to be appreciated that the generation of these non-overlapping clocking signals can be done in a conventional manner well known in the art. The sampling signal occurring at the output of the one-short circuit 84 is also illustrated in FIG. 4. The sampling signal reflects a successive triggering of the one-shot circuit 84 by the leading edges of the pulses occurring in the clock signals C1 and C2. The sampling signal dictates the rate of sampling by the A/D converter 82. The A/D converter 82 thereafter performs the analog to digital conversion and indicates when the conversion has been completed. This latter indication occurs in the form of an end of conversion signal which is illustrated in FIG. 4 as an EOC signal. It is to be noted that the EOC signal changes signal state shortly after the sampling signal. This time delay of $\tau$ merely reflects the conversion time of the A/D converter. The significance of this signal will be explained in detail hereinafter.

Referring again to FIG. 3, it is noted that the digital output of the A/D converter 82 is applied to the left side of a compare circuit 92 via a bus 94. The bus 94 preferably comprises ten separate bit lines which are individually received by the compare circuit 92. This allows for a maximum generated digital command of up to one thousand twenty-four units. The right side of the compare circuit 92 also receives a ten bit digital count from a counter 96 via a bus 98. As will be explained in detail hereinafter, the digital counter 96 maintains a current count of actually commanded infeed pulses occurring on the output lines 42 and 44.

The compare circuit 92 is operative to continuously compare the output from the A/D converter 82 with the output of the digital counter 96. The compare circuit 92 is operative to generate a logically high signal on a line 100 when the numerical value of the bits present on the bus 94 is greater than the numerical value of the bits present in the bus 98. The compare circuit is furthermore operative to generate a logically high signal on a line 102 when the numerical value of the bits present on the bus 98 is greater than the numerical value of the bits present on the bus 94. The compare circuit is also operative to generate a logically high signal on a line 104 when the bits present on the bus 94 are equal to the numerical value of the bits present on the bus 98. The signal on the line 100 is applied to a NAND gate 106 whereas the signal present on the line 102 is applied to a NAND gate 108. The NAND gates 106 and 108 also receive an enabling signal from a profile switch 110. The profile switch 110 is switched logically high in response to a profile infeed command activation by either the operator or a higher order control system. The NAND gate 106 may now be enabled by a logically high signal on the line 100 indicating that the numerical value of the bits present on the bus 94 is greater than the numerical value of the bits present on the bus 98. This allows the NAND gate 106 to gate the clock pulse signals C1 present on the line 86. The clock pulses are applied to a latch circuit 112. It is to be noted that the NAND gate 108 will be inhibited during this time by a logically low signal on the line 102. This situation will reverse at such time as the comparison by the compare circuit 92 indicates that the numerical value of the bits present on the bus 94 is less than the numerical value of the bits present on the bus 98. When this occurs, the signal on the line 102 will be logically high so as to thereby enable the NAND gate 108 whereas the signal present on the line 100 will be logically low so as to inhibit the NAND gate 106. This will result in the clock pulse signal C2 present on the line 88 being gated through the NAND gate 108 so as to be applied to the latch circuit 112.

In addition to receiving the gated signals from the NAND gates 106 and 108, the latch circuit 112 also receives the end of conversion signal EOC from the A/D converter 82 via a line 114. The latch circuit 112 furthermore receives the signal present on the line 104 indicating that the numerical value of the bits present on the bus 94 is equal to the numerical value of the bits present on the bus 98. Referring to FIG. 4, the operation of the latch circuit is illustrated in response to these various signals. In this regard, it is first of all to be noted that the end of conversion signal present on the line 114 and the equal comparison signal present on the line 104 must both be logically low in order to enable the latch circuit 112. As can be seen in FIG. 4, the equal comparison signal is logically low for long periods of time signifying that an equal comparison is not occurring in the compare circuit 92. On the other hand, the EOC signal is only periodically low following the completion of each digital conversion by the A/D converter 82. These logically low signal levels occur at specific periods of time relative to the clock signals C1 and C2. Specifically, a logically low level is present in the EOC signal each time a trailing edge is encountered for a clock pulse in either the C1 or C2 signals. In this manner, the EOC signal periodically enables the latch circuit 112 for the same type of signal transition occurring in each of the clock signals. At this time, parallel data is now valid for comparison.

Assuming that the NAND gate 106 has been enabled in response to an indication that the numerical value of the bits present on the bus 94 is greater than the numerical value of the bits present on the bus 98, the clock pulses in the clock signal C1 will be inverted through the NAND gate 106 and applied to the latch circuit 112. The latch circuit will be operative to latch onto the inverted trailing edge of each gated clock pulse so as to thereby produce a pulse on the output line 42. This is illustrated in FIG. 4 as a pulse P1 occurring in a forward profile command signal present on the output line 42. It is to be noted that the pulse P1 is in response to a trailing edge in the clock signal C1 occurring at time T1. This will continue to occur until such time as an equal comparison is noted on the line 104. This occurs in FIG. 4 at a time T2. At this time, the latch circuit 112 will be disabled by the logically high signal level of the equal comparison signal. As can be seen in FIG. 4, the forward profile command signal does not react to the next trailing edge in the C1 clock signal. The final set of signal conditions to be illustrated in FIG. 4 is that of the numerical value of the bits present on the bus 94 being less than the numerical value of the bits present on the bus 98. When this occurs, the compare circuit enables the NAND gate 108 which in turn gates the clock signal C2 through to the latch circuit 112 in an inverted fashion. The latch circuit 112 will be operative to latch onto the inverted trailing edge of each gated clock pulse so as to thereby produce a pulse on the output line 44. This is illustrated in FIG. 4 as pulses P2 and P3 occurring in a reverse profile command signal present on the line 44. It is to be noted that these pulses occur in response to trailing edges present in the clock signal C2 at times T3 and T4.

Referring to FIG. 3, the forward and reverse pulses present on the lines 42 and 44 are applied to the counter 96. The counter 96 is operative to incrementally count upwardly in response to forward pulses and to incrementally count downwardly in response to reverse pulses. This count is reflected in the individual bit lines within the bus 98 that are applied to the compare circuit 92. In this manner, the compare circuit 92 is able to continuously compare the count of the commanded profile infeed issuing on the lines 42 and 44 with respect to the most recently digitized profile signal as reflected on the bit lines within the bus 94.

Figure 5:
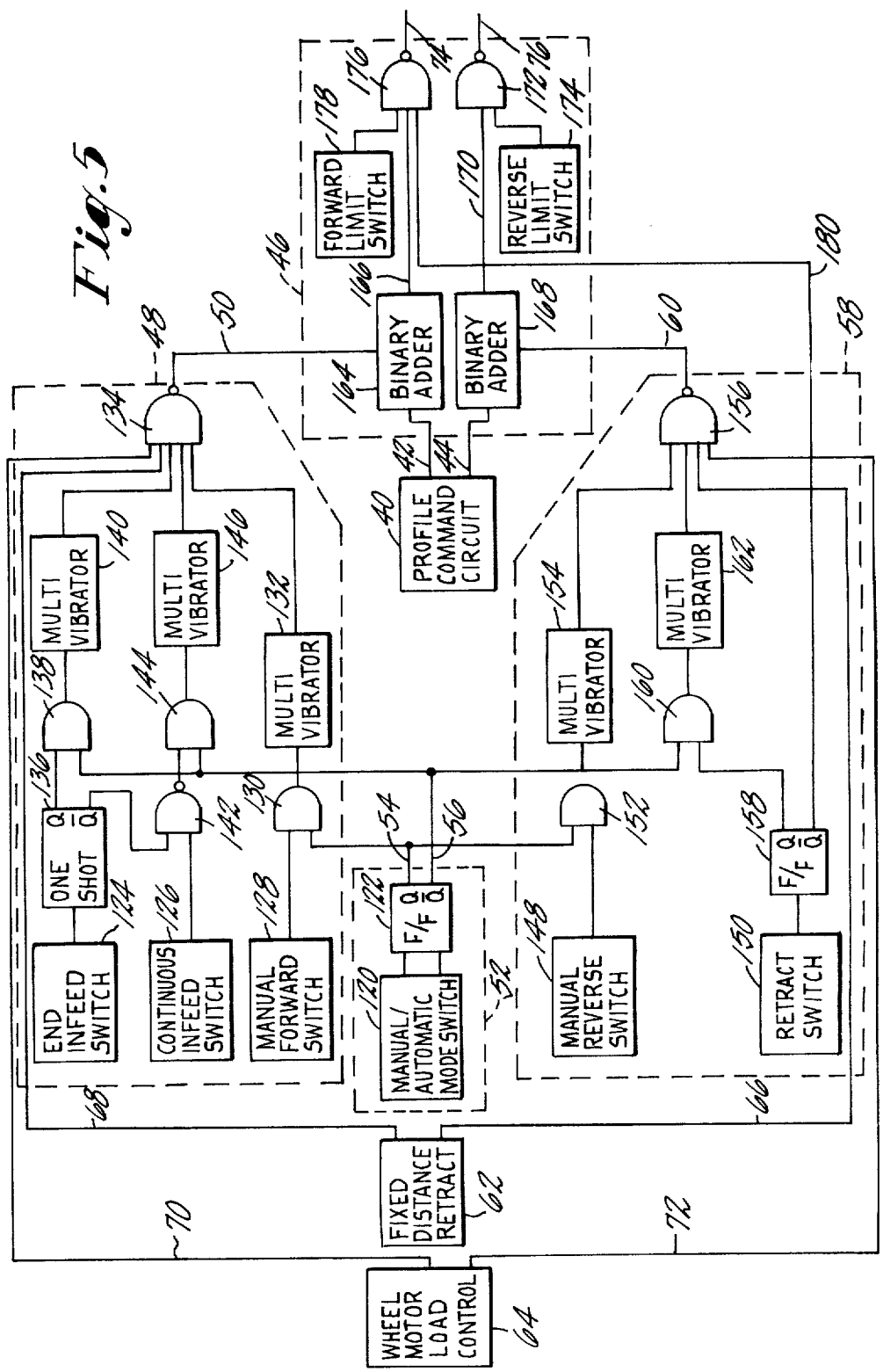
FIG. 5 is a detailed illustration of certain control circuitry present within the digital control system of FIG. 2.

Having now discussed the profile command circuit 40 in detail, it is now appropriate to turn to some of the other digital circuits within the overall control system of FIG. 2. In this regard, FIG. 5 illustrates in further detail, the manual/automatic mode selection 52, the forward digital command circuit 48, the digital command output circuit 46, and the reverse digital command circuit 58. The aforementioned circuits are all illustrated within dotted outlines in FIG. 5. In addition, the profile command circuit 40, the fixed distance retract circuit 62, and the wheel motor load control circuit 64 are also again shown in much the same manner as they appear in FIG. 2.

The manual/automatic mode selection circuit 52 is seen to consist of a manual/automatic mode switch 120 which is connected to a flip flop 122. The assertion and negation outputs of the flip flop 122 are applied to both the forward digital command circuit 48 and the reverse digital command circuit 58. The assertion signal is carried over the line 54 whereas the negation signal is carried over the line 56. In accordance with the invention, the assertion output of the flip flop 122 will be logically high for a selection of the manual mode by the manual/automatic mode switch 120. This will result in a logically high bilevel signal on the line 54 and a logically low bilevel signal on the line 56. On the other hand, a selection of an automatic mode by the manual/automatic mode switch 120 will set the flip flop 122 logically low. This will result in a logically low bilevel signal on the line 54 and a logically high bilevel signal on the line 56.

Referring now to the forward digital command circuit 48, it will be remembered that this circuit receives infeed commands of: end infeed, continuous infeed, and manual infeed. These various input commands are provided for by an end infeed switch 124, a continuous infeed switch 126, and a manual forward switch 128. Assuming that a manual mode has been selected through appropriate activation of the manual/automatic mode switch 120, an AND gate 130 will be enabled by virtue of a logically high bilevel signal on the line 54. Activation of the manual forward switch 128 will produce a logically high signal which will be gated through the thus enabled AND gate 130 so as to thereby be applied to a multivibrator 132. The thus activated multivibrator 132 is operative to produce a train of pulses having a predefined frequency. The multivibrator 132 is a standard integrated circuit which is capable of being set both as to frequency and to pulse configuration. The pulse train emanating from the multivibrator 132 is applied to a NAND gate 134. As will become apparent hereinafter, the NAND gate 134 will be otherwise enabled so as to thereby gate the pulse train generated by the multivibrator 132. This pulse train is applied to the digital command output circuit 46 via the line 50. This pulse train will be interpreted by the digital command output circuit as a forward movement command in the amount dictated by the number of command pulses gated from the NAND gate 134.

Turning now to the pulse generation capabilities of the forward digital command circuit 48 for an automatic mode, the end infeed will be discussed first. It will be remembered that an end infeed is to be accomplished at the end of the workpiece roll. This is accomplished by activating the end infeed switch 124 which in turn triggers a one-shot 136. The one-shot 136 produces a pulse of a predefined width which defines the time frame for the end grinding of the workpiece roll. This pulse is applied to an AND gate 138 which will be enabled during an automatic mode. Specifically, the bilevel signal will be logically high on the line 56 for an automatic mode selection. The thus enabled AND gate 138 will gate the pulse output from the one-shot 136 so as to trigger a multivibrator 140. The multivibrator 140 will produce a pulse train having a pre-defined frequency for the period of time dictated by the gated pulse from the AND gate 138. This pulse train will be gated through the NAND gate 134 and applied to the digital command output circuit 46 via the line 50. This pulse train will result in a forward infeed of the amount defined by the thus applied pulse train.

It is to be noted that the negation output of the one-shot circuit 136 is applied to a NAND gate 142. The negation output of the one-shot circuit 136 will be logically low during an end infeed grinding operation. This will disable the NAND gate 142 until such time as the end infeed grinding has been completed. It will be remembered that this period is defined by the width of the pulse from the one-shot circuit 136. When the end infeed grinding has been thus completed, the now enabled NAND gate 142 will respond to the signal state of the continuous infeed switch 126. An activated continuous infeed switch 126 will produce a logically low signal at its output. This logically low signal will result in the enabled NAND gate 142 switching logically high. This output signal condition of the NAND gate 142 will be gated through an AND gate 144 during an automatic mode. The thus gated signal is applied to a multivibrator 146 which is set to produce a relatively low frequency train of pulses at its output. This low frequency pulse output is applied to the NAND gate 134 which in turn defines a train of pulses on the line 50. This particular low frequency train of pulses is operative to define a continuous infeed which compensates for the wear of the grinding wheel.

As has been previously discussed, the NAND gate 134 must be appropriately enabled so as to respond to the various pulse trains emanating from the multivibrators 132, 140 and 146. This is accomplished by requiring each of these multivibrators to generate negative pulses which end in a logically high signal state upon completion of each pulse and at the end of a train of pulses. In this manner, the logically high enabling signal conditions will always be present at the NAND gate 134. As will become apparent hereinafter, this signal convention is also adhered to on the line 68 from the fixed distance retract circuit 62 as well as the line 70 from the wheel motor load control circuit 64.

Referring now to the reverse digital command circuit 58, it will be remembered that this circuit is responsive to both a manual reverse and a retract command. These two external commands are provided by a manual reverse switch 148 and a retract switch 150. Referring first to the manual reverse switch 148, it is seen that the output of this switch is applied to an AND gate 152. The AND gate 152 will be enabled during a manual mode so as to thereby gate the logically high signal condition to a multivibrator 154. The multivibrator 154 will generate a pulse train as long as the manual reverse switch 148 remains activated. This pulse train is gated by a NAND gate 156 so as to form a stream of reverse command pulses on the line 60. This stream of pulses is applied to the digital command output circuit 46 which in turn commands the grinding wheel to move backwardly and away from the workpiece roll.

Referring now to the retract switch 150, it is seen that the output of this switch is connected to a flip flop 158. The activation of the retract switch 150 will set the flip flop 158 logically high so as to result in a logically high signal being applied to an AND gate 160. The AND gate 160 will be enabled by a logically high signal on the line 56 for an automatic mode of operation. The output signal from the flip flop 158 will hence be gated by the AND gate 160 and applied to a multivibrator 162. The multivibrator 162 will produce a train of pulses of predefined frequency which are applied to the NAND gate 156. The NAND gate 156 will be enabled due to the inoperative logically high signal state of the multivibrator 154. The resulting train of pulses appearing on the line 60 will result in a retraction of the grinding wheel from the workpiece.

It is to be noted from the above that the NAND gate 156 is maintained in an enabled state due to the output signal state of the multivibrator 154. The multivibrator 162 will similarly end in a logically high signal state so as to enable the NAND gate 156 for receipt of any negative pulses from an activated multivibrator 154. In this manner, the multivibrators 154 and 162 are initially set up in much the same manner as the multivibrators 132, 140 and 146 within the forward digital command circuit. Furthermore, the signal from the fixed distance retract circuit 62 which is present on the line 66 and constituting an input to the NAND gate 156 is similarly required to normally be logically high and to otherwise transmit negative pulses. The signal on the line 72 from the load control circuit 64 is also required to follow this signal convention.

Referring now to the digital command output circuit 46, it will be remembered that this circuit is operative to generate motor control pulses on either a line 74 or a line 76 in response to having received various pulse signals at its inputs. The input signals to the digital command output circuit are produced by the profile command circuit 40, the forward digital command circuit 48, and the reverse digital command circuit 58. As has been previously discussed, two of these pulse signals are indicative of forward infeed whereas two other pulse signals are indicative of a reverse infeed movement of the grinding wheel.

The pulse signals indicative of a forward infeed movement of the grinding wheel appear on the line 42 from the profile command circuit and the line 50 from the forward digital command circuit 48. These signals are applied to a binary adder 164 within the digital command circuit 46. The binary adder 164 is operative to perform a binary addition for each pulse received on either the line 42 or the line 50. Each such binary add operation by the binary adder 164 results in a forward motor control signal pulse being produced on an output line 166.

The digital command output circuit 46 is seen to also include a binary adder 168. The binary adder 168 receives pulse indicating a reverse infeed movement from both the profile command circuit 40 and the reverse digital command circuit 58. The pulses from the profile command circuit 40 arrive via the line 44 whereas the pulses from the reverse digital command circuit 58 arrive via the line 60. The binary adder 168 is operative to perform a binary addition for each so received pulse on either the line 44 or the line 60. Each such binary add operation by the binary adder 168 results in a reverse motor control signal pulse being produced on an output line 170.

It is to be noted that the binary adders 164 and 168 perform the function of producing a motor control signal pulse at their respective outputs in response to having received a pulse at either of their two respective inputs. In other words, a pulse is generated at the output of each binary adder for each and every pulse received at its respective inputs. It is to be appreciated that this is the overall system function performed by the binary adder circuits 164 and 168.

The motor control signal pulses produced at the output of the binary adder 168 and appearing on the line 170 are applied to a NAND gate 172. The NAND gate 172 will be enabled unless a reverse limit switch 174 has been activated. In this regard, the reverse limit switch 174 establishes a limit for reverse movement of the grinding wheel. This limit switch is normally not activated and hence provides a logically high signal to the NAND gate 172 so as to thereby enable the gating of any pulses appearing on the line 170. These gated pulses will appear on the line 76. It will be remembered from the discussion of FIG. 2 that pulses on the line 76 are applied to the motor control 78 so as to thereby ultimately produce a reverse motion of the grinding wheel.

Referring now to the pulses appearing at the output of the binary adder 164 on the line 166, it is seen that these pulses are applied to a NAND gate 176. The NAND gate 176 will normally be enabled by the output signal states of a forward limit switch 178 and the negation output of the flip flop 158 within the reversed digital command circuit 58. It will be remembered that the flip flop 158 is only set to a logically high signal state during a retract operation. This will cause the negation output to be logically low thereby producing a signal on a line 180 which disables the NAND gate 176. This effectively prevents any forward commands during a retract operation. The NAND gate 176 will otherwise be enabled unless the forward limit switch 178 is triggered so as to thereby produce a logically low signal state. The forward limit switch 178 defines the limit of forward movement of the grinding wheel. The normally enabled NAND gate 176 will hence gate the forward command pulses present on the line 166 unless the forward limit has been reached. These pulses will appear in inverted fashion in the line 74. These pulse signals will thereafter be applied to the motor control 78 so as to ultimately cause the infeed motor 20 to move the grinding wheel forward relative to the workpiece roll.

It is to be appreciated from the above that the motor control 78 responds to pulse signals appearing on either the line 74 or the line 76. These pulse signals will dictate movement in either the forward infeed direction in the case of the line 74 or the reverse infeed direction in the case of the line 76. These pulse signals will either occur separately or simultaneously during the normal operation of the control system of FIG. 5. In the latter event, the motor control 78 is operative to first cancel the simultaneously received pulse signals before presenting a control signal to the infeed motor 20. In this manner, the motor control 78 will always prescribe a relatively smooth movement for the infeed motor 20.

Figure 6:
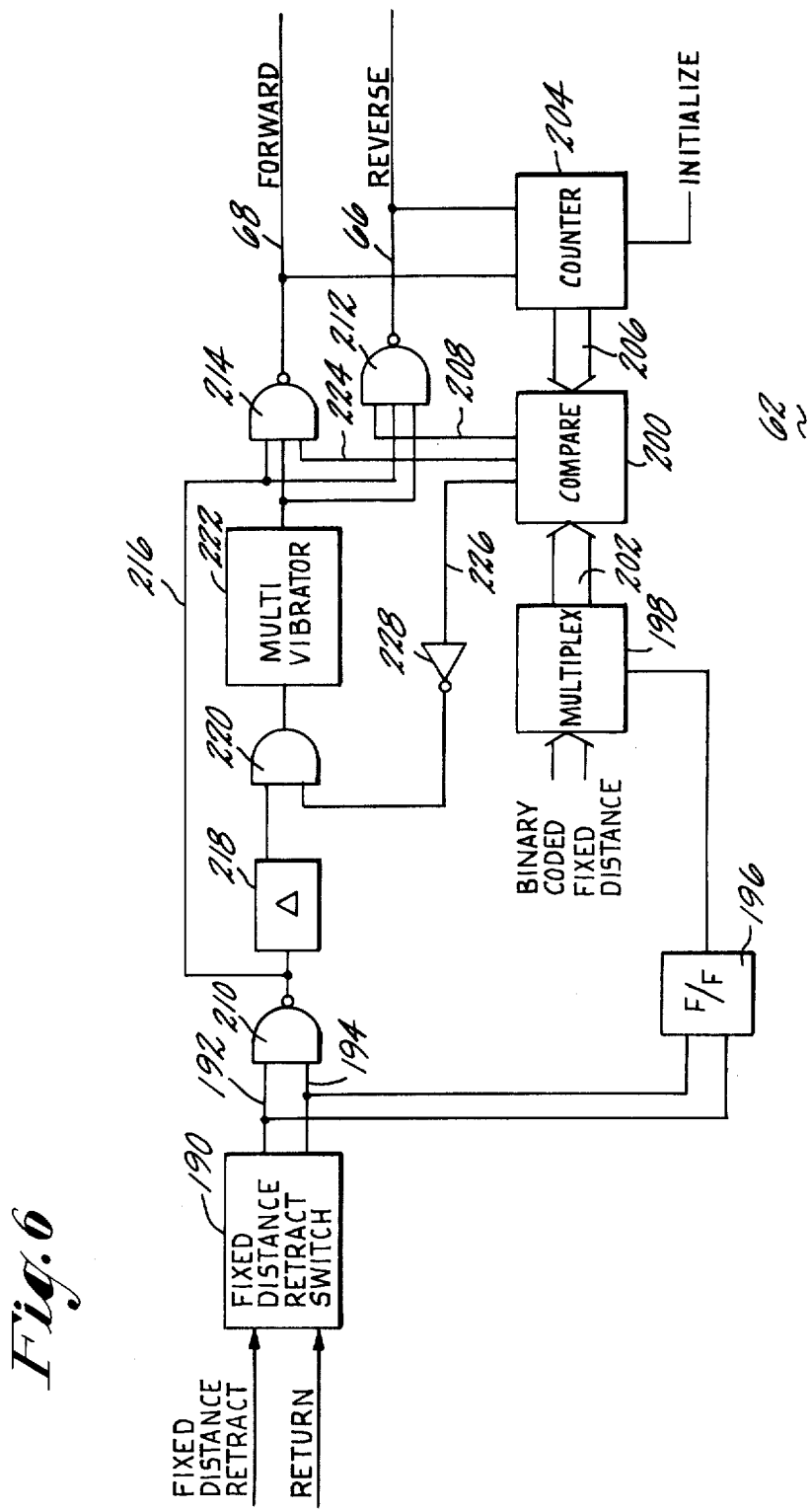
FIG. 6 is a detailed illustration of a fixed distance retract circuit present within the digital control system of FIG. 2.

Referring now to FIG. 6, the fixed distance retract circuit 62 is illustrated in detail. It will be remembered from the discussion of FIG. 2 that the fixed distance retract circuit constitutes a separate control function within the overall control system. The purpose of this control function is to rapidly retract the grinding wheel a fixed distance from the workpiece. The grinding wheel is thereafter returned to its original position.

The fixed distance retract as well as the return are commanded by activation of a fixed distance retract switch 190. The fixed distance retract switch 190 actually comprises two separate binary switches which are individually activated for the fixed distance retract operation and for the return operation. The return cannot be activated without a fixed distance retrace activation having previously occurred. This interdependent relationship of two input switches is well known in the art.

The fixed distance retract switch 190 generates two separate bilevel output signals on a pair of lines 192 and 194. These bilevel output signals will normally be logically high unless one of the switch inputs to the fixed distance retract switch 190 has been activated. The bilevel signal present on the line 192 will switch logically low when the fixed distance retract input switch has been activated. On the other hand, the bilevel output signal present on the line 194 will switch logically low when the return input switch has been activated.

Referring first to the activation of the fixed distance retract input switch, the transition to a logically low signal state on the line 192 will edge trigger a flip flop 196. The logically high output signal state of the flip flop 196 will be applied to a multiplex circuit 198. The multiplex circuit 198 will be operative to apply a binary coded fixed distance to a compare circuit 200 via bus 202. The bus 202 will comprise a number of separate bit lines corresponding to the number of bits necessary to encode the fixed distance in binary. In this regard, the fixed distance is preferably encoded as an eight bit input wherein all bits are ones. It is to be noted that any arbitrary fixed distance may be encoded in binary and applied to the individual bit inputs of the multiplex circuit 198. The compare circuit 200 also receives a binary count from a counter 204 via a bus 206. The binary count received from the counter 204 is always initially a ones complement of the binary coded fixed distance that has been applied to the compare circuit 200 via the bus 202. In this regard, the binary count is preferably eight logically zero bits. It is to be noted that the count in the counter 204 is initially set to such a predefined count by an initializing signal applied to the counter 204 accompanying the application of power.

It is to be appreciated that the compare circuit 200 will have thus received a binary coded fixed distance via the bus 202 which is greater than the binary count indicated on the bus 206. This will result in a logically high bilevel signal on a line 208 signifying that the binary count on the left side of the compare circuit 200 is greater than the binary count on the right side.

Referring now again to the two outputs of the fixed distance retract switch 190, it will be remembered that the activation of the fixed distance retract input switch will produce a logically low signal on the line 192. The switch to a logically low signal state on the line 192 will cause a NAND gate 210 to go logically high. This will result in a logically high enabling signal being applied to a pair of NAND gates 212 and 214 via a line 216. The logically high output of the NAND gate 210 will furthermore be delayed by a delay circuit 218 and applied to an AND gate 220. The AND gate 220 will normally be enables so as to apply the logically high signal transition to a multivibrator circuit 222. The multivibrator circuit 222 will generate a pulse train of prescribed frequency which will assure a rapid retraction. This pulse train will be applied to both the NAND gates 212 and 214. As has been previously discussed, the compare circuit 200 will have produced a logically high signal on the line 208 so as to have enabled the NAND gate 212. The NAND gate 214 will be inhibited by logically low signal appearing on a line 224. This latter signal merely indicates that the right side of the compare circuit is not greater than the left side of the compare circuit. With the NAND gate 212 thus only enabled, a train of negative pulses will appear on the output line 66. It will be remembered that this output line is applied to the NAND gate 156 within the reverse digital command circuit 58 of FIG. 5. It will be furthermore remembered that the NAND gate 156 is normally enabled so as to thereby gate the pulses to the digital command output circuit 46 which in turn produces an appropriate reverse command pulse train to the motor control.

The counter 204 is also responsive to the pulses appearing on the output line 66 so as to thereby increment the binary count present on the bus 206. This count is continuously incremented until such time as the binary count present on the bus 206 is equal to the binary coded fixed distance retract present on the bus 202. At this time, the bilevel signal present on the line 208 drops logically low and thus disables the NAND gate 212. Simultaneously, a logically high signal is generated on a line 226 indicating a state of equilibrium within the compare circuit 200. This logically high signal is inverted by an inverter 228 so as to provide a logically low inhibiting signal to the AND gate 220. This switches the output of the AND gate 220 logically low so as to thereby deactivate the multivibrator 222. The output of the multivibrator will remain in a logically low signal state until again activated.

The grinding wheel will remain in a fixed retract position until such time as the return switch is activated within the fixed distance retract switch 190. This will not occur before the fixed distance retract is first deactivated. This will result in both output signals on the lines 192 and 194 being logically high at such time as the fixed distance retract input switch is deactivated. When the return input switch is next activated, the bilevel signal present on the line 194 will switch logically low. This will in turn set the flip flop 196 logically low. The logically low signal state of the flip flop 196 will cause the multiplex circuit 198 to switch from the binary coded fixed distance intput to a ones complement thereof. This would preferably define an eight bit count of all zeros which would be applied to the compare circuit 200 via the bus 202. The counter 204 will have been previously frozen at the binary count equal to the commanded fixed distance retraction. This will result in the compare circuit 200 issuing a logically high signal on the line 224 indicating that the numerical value of the bits present on the bus 206 are greater than the numerical value of the bits present on the bus 202. This will enable the NAND gate 214. Referring now to the NAND gate 210, it will be remembered that the two bilevel signal inputs will be logically high prior to the activation of the return input switch. This will allow the NAND gate 210 to switch logically high at such time as the bilevel signal present on the line 194 switches logically low upon activation of the return switch. This logically high signal state will enable both the NAND gate 212 and the NAND gate 214. This logically high signal state will furthermore be delayed through the delay circuit 218 and gated through the AND gate 220 so as to thereby activate the multivibrator 222. This will result in a train of negative pulses being gated through the enabled NAND gate 214 so as to define a forward command on the output line 68. This output line defines an input to the NAND gate 134 within the forward digital command circuit 48 of FIG. 5. The pulse train present on the line 68 is gated by the NAND gate 134 and applied to the digital command output circuit 46. This ultimately produces a forward command to the servo motor control 78 which causes the grinding wheel to move inwardly toward the workpiece roll. This inward movement will be limited to the previous outward movement commanded by the fixed distance retract logic. Specifically, the counter 204 will decrement its stored count in response to the forward command pulses present on the output line 68. The binary count thus present on the bus 206 will ultimately reach the binary count defined on the bus 202. At this time, the bilevel signal present on the line 224 will no longer indicate a right side greater than left side comparison by the compare circuit 200. This will disable the NAND gate 214. As has been previously indicated, the equal comparison condition will result in a logically high signal present on the line 226 which will ultimately inhibit any further generation of pulses by the multivibrator 222. In this manner, the fixed distance retract circuit 62 will have implemented both a retraction and a return to original position of the grinding wheel.

Figure 7:
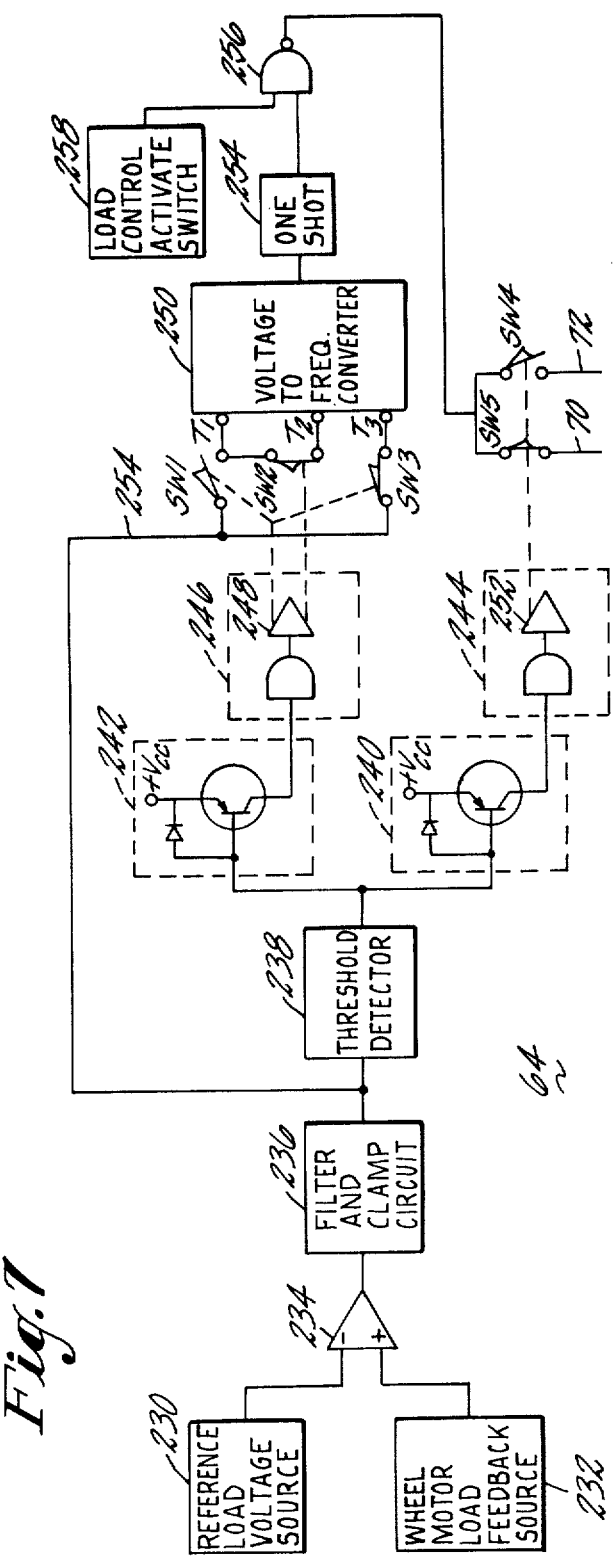
FIG. 7 is a detailed illustration of a wheel motor load control circuit present within the digital control system of FIG. 2.

Referring to FIG. 7, the wheel motor load control circuit 64 is illustrated in further detail. It will be remembered from the discussion of the wheel motor load control circuit in FIG. 2 that the objective of this circuit is to maintain a predefined load on the wheel motor 18. This particular control is realized when the wheel motor load control circuit 64 has been activated by either an operator or a higher ordered control system. The thus activated wheel motor load control circuit will produce variable frequency trains of pulses on the lines 70 and 72. These pulses combine with other ordered infeed command signals so as to define the desired load condition on the wheel motor 18.

The predefined load condition for the wheel motor 18 is provided by a reference load voltage source 230 in FIG. 7. It is to be appreciated that the reference load voltage source can comprise any number of devices capable of establishing arbitrarily defined voltages. The voltage which is thus defined is representative of the particular wheel motor load that is then desired for the particular roll grinding operation.

The thus defined reference load voltage is compared with an actual motor load condition as defined by a wheel motor load feedback source 232. The wheel motor load feedback source 232 senses the armature current present in the wheel motor 18 and produces a voltage representative thereof. This voltage is applied to the positive input of a differential amplifier 234 which also receives the reference load voltage at its negative input. The difference between the thus received voltages constitutes an error signal at the output of the differential amplifier 234. This error signal will be positive when the actually experienced motor load condition is greater than the predefined reference load. The error signal will be negative when the reference load exceeds the actually experienced motor load. In either case, the error signal from the differential amplifier is applied to a conventional filter and clamp circuit 236. This latter circuit filters the error signal so as to preclude excess noise and thereafter clamps the signal so as to limit the top range of load control. The resultingly filtered and clamped error signal is applied to a threshold detector 238. The threshold detector 238 is operative to control a pair of transistor switches 240 and 242 in response to the positive or negative status of the filter and clamped error signal. In this regard, when the filter and clamped error signal is positive indicating that the actual load is greater than the referenced load, the transistor switches 240 and 242 will be maintained in an off state. On the other hand, when the filter and clamped error signal to the threshold detector circuit 238 is negative indicating that the referenced load is greater than the actual motor load, then the transistor switches 240 and 242 are switched to an active state.

The output signal states of the transistor switches 240 and 242 are applied to a pair of high-speed driver circuits 244 and 246. The high-speed driver circuits each comprise a buffer gate upstream of a dual channel amplifier. The outputs of the dual channel amplifier 248 within the driver circuit 246 control three separate switches SW1, SW2, and SW3 connected to the terminals $T_1$, $T_2$ and $T_3$ of a voltage to frequency converter 250. The active output of a dual channel amplifier 252 within the driver circuit 244 controls two switches SW4 and SW5. The switches SW1 through SW5 are each single pole double throw field effect transistor switches controlled by the respective outputs of the dual channel amplifiers 248 and 252. The switches will be maintained in their respectively illustrated states of FIG. 7 when a negative filtered and clamped error signal is present at the input of the threshold detector 238.

Referring first to the states of the switches SW1, SW2, and SW3, it is seen that SW1 is an open state and switches SW2 and SW3 and in a closed state. The switch SW3 receives the negative filtered and clamped error signal from the filter and clamp circuit 236 over a line 254. This negative signal is transmitted through the closed switch SW3 to an input terminal $T_3$ of the voltage to frequency converter 250. The voltage to frequency converter 248 is preferably a Datel VFV-10k voltage to frequency converter requiring a particular processing of a negative input signal. This particular voltage to frequency converter is available from the Datel Systems, Inc. of Canton, Massachusetts. In accordance with the operation of the Datel voltage to frequency converter, the negative input signal is internally inverted and made available to an output terminal $T_2$ associated with the closed switch SW2. The inverter signal is thereafter transmitted through the closed switch SW2 to a positive input terminal $T_3$. The voltage to frequency converter 250 will convert the thus applied analog signal to a frequency directly proportional to the magnitude of the analog signal. The voltage to frequency converter will subsequently produce a pulse train having the thus derived output frequency. This pulse train is applied to a one-shot circuit 254 which merely stretches the width (but not the frequency) of the thus receives pulses. The modified pulse train is thereafter applied to a NAND gate 256. The output of the NAND gate 256 will normally be logically high so as to transmit negative pulses when enabled by a load control switch 258. The load control switch is selectively activated when the load control is desired. The resulting train of negative pulses issuing from the NAND gate 256 exits through a closed switch SW5 onto the output line 70. The switch SW5 is closed by virtue of the output state of the dual channel amplifier 252. The train of pulses on the line 70 is applied to the NAND gate 134 within the forward digital command circuit 48 of FIG. 5. In this manner, the pulses train on the line 70 combines with any other pulse trains present within the overall control system of FIG. 2 so as to effectuate a given infeed rate of the grinding wheel. This defines a particular load condition on the wheel motor 18 which is sensed by the wheel motor load feedback source 232. The thus sensed change in the actual motor load should decrease the original error between the actual motor load and the referenced motor load. In this regard, the actual motor load change should be positive as a result of the increased infeed rate resulting from the forward pulse contribution.

It is to be appreciated that the above discussion was with reference to a negative error wherein the reference load exceeded the actual motor load. The wheel motor load control system 64 is also operative to decrease the wheel motor load when a positive error exists between the actual motor load and that of the reference load. In this instance, the positive error signal at the output of the differential amplifier 234 is filtered and clamped by the filter and clamp circuit 236 so as to present a positive signal to the threshold detection circuit 238. The threshold detector 238 will switch the transistor switches 240 and 242 to an on state. This will result in the input switches SW2 and SW3 being switched open whereas the switch SW1 will be closed. This will furthermore dictate that the switch SW4 will close and the switch SW5 will open under the control of the dual channel amplifier 252. A positive error signal will be transmitted by the switch SW1 to the positive input terminal $T_1$ of the voltage to frequency converter 250. This will result in a pulse train issuing from the voltage to frequency converter 250 wherein the pulse train will have a frequency proportional to the magnitude of the error signal present at its positive input terminal. The pulses within the pulse train will be stretched by the one-shot circuit 254 and applied to the NAND gate 256. An enabled NAND gate 256 will produce a train of negative pulses which exit from the wheel motor load control circuit 64 through a closed switch SW4 onto the output line 72. Refering to FIG. 2, it is to be noted that the pulse train on the line 72 is applied to the NAND gate 156 within the reverse digital command circuit 58. This will result in the pulses on the line 72 being combined with other existing infeed commands so as to cause the wheel motor 18 to ultimately lose load until the desired infeed rate is achieved.

The aforementioned operation of the wheel motor load control circuit 64 will continue as long as the circuit remains activated by the switch 258. In this regard, the load control will continue to produce pulses on either of the output lines 70 or 72 so as to thereby combine with other commanded infeed signals present within the overall control system. The resulting combination of commanded infeed signals including that of the wheel motor load control circuit 64 will combine to define the motor load experienced by the wheel motor 18.

From the foregoing, it is to be appreciated that a preferred embodiment has been disclosed of a digital control system for a roll grinding machine. It is to be appreciated that this control system might also be employed with other machinery requiring combined infeed or reverse commands of a tool relative to a workpiece. It is furthermore to be understood that alternative digital logic may be substituted for elements of the preferred embodiment without departing from the scope of the present invention.

Having thus described our invention, what we claim as new and desire to secure by Letters Patent of the United States is:

1. In a roll grinding machine, a system for controlling the infeed positioning of a grinding wheel relative to the roll, said system comprising:
   means for generating a set of infeed positioning signals which respectively define inward and outward motions of the grinding wheel;
   means for generating a first additional infeed positioning signal which is to be combined with the infeed positioning signal defining inward motion of the grinding wheel;
   means for generating a second additional infeed positioning signal which is to be combined with the infeed positioning signal defining outward motion of the grinding wheel; and
   means, responsive to said first set of infeed positioning signals and said first and second additional infeed positioning signals, for moving the grinding wheel.

2. The system of claim 1 wherein said means for generating a set of infeed positioning signals comprises:
   means for defining a grinding profile along the length of the roll; and
   means, responsive to the defining of a grinding profile for selectively producing a first and second train of pulses.

3. The system of claim 2 wherein said means for generating a set of infeed positioning signals further comprises:
   an analog to digital converter operative to generate a digital value indicative of the grinding profile; and
   means for comparing the digital value indicative of the grinding profile with the number of pulses generated by said means for generating the first and second trains of pulses.

4. The system of claim 3 wherein said means for generating a first additional infeed positioning signal comprises:
   means for commanding a plurality of distinct inward motions of the grinding wheel relative to the roll; and
   means, responsive to said command means, for implementing only one of said commanded inward motions at any one period of time.

5. The system of claim 4 wherein said means for implementing only one of said commanded inward motions at any one period of time comprises:
   a plurality of means for generating trains of pulses at predefined frequencies wherein each frequency defines a distinct type of inward motion; and
   means for selectively activating each pulse generating means.

6. The system of claim 5 wherein said means for selectively activating each pulse generating means comprises:
   mode selection means for selectively defining both a manual and an automatic mode of operation, said mode selection means being operative to selectively enable at least one of said pulse generating means for each mode of operation.

7. The system of claim 5 wherein said means for implementing only one of said commanded inward motions at any one time further comprises:
   means, connected to each of said pulse generating means, for gating the separately generated trains of pulses as the first additional infeed positioning signal.

8. The system of claim 7 wherein said means for generating a second additional infeed positioning signal comprises:
   means for commanding a plurality of distinct outward motions of the grinding wheel relative to the roll; and
   means, responsive to said plurality of command means, for implementing only one of said commanded outward motions at any one period of time.

9. The system of claim 8 wherein said means for implementing only one of said commanded outward motions at any one period of time comprises:
   a plurality of means for generating trains of pulses at predefined frequencies wherein each frequency defines a distinct type of outward motion; and
   means for selectively activating each pulse generating means.

10. The system of claim 9 wherein said means for selectively activating each pulse generating means comprises:
    mode selection means for selectively defining both a manual and an automatic mode of operation, said mode selection means being operative to selectively enable at least one of said pulse generating means for each mode of operation.

11. The system of claim 9 wherein said means for implementing only one of said commanded outward motions at any one time further comprises:
    means, connected to each of said pulse generating means, for gating the separately generated trains of pulses as the second additional infeed positioning signal.

12. The system of claim 1 wherein said means for moving the grinding wheel comprises:
    control means, responsive to one of the set of infeed positioning signals and the first additional infeed positioning signal for producing a first control signal, said control means being furthermore responsive to the other of the set of infeed positioning signals and the second additional infeed positioning signal so as to produce a second control signal.

13. The system of claim 12 wherein said control means, comprises:
    means for combining one of the set of infeed positioning signals and the first additional infeed positioning signal so as to produce a first control signal; and
    means for combining one of the set of infeed positioning signals and the second additional infeed positioning signal so as to produce a second control signal.

14. The system of claim 1 wherein said means for generating a first additional infeed positioning signal comprises:

means for commanding a plurality of distinct inward motions of the grinding wheel relative to the roll; and means, responsive to said command means, for implementing only one of said commanded inward motions at any one period of time.

15. The system of claim 14 wherein said means for generating a second additional infeed positioning signal comprises:

means for commanding a plurality of distinct outward motions of the grinding wheel relative to the roll; and means, responsive to said plurality of command means, for implementing only one of said commanded outward motions.

16. The system of claim 15 further comprising:

mode selection means for selectively defining both a manual and an automatic mode of operation, said mode selection means being operative to provide an indication of the selected mode to both said means for implementing only one of said commanded inward motions and said means for implementing only one of said commanded outward motions.

17. The system of claim 1 further comprising:

means for commanding a fixed distance retract of the grinding wheel from its operative position relative to the roll;

means for commanding a return of the grinding wheel to its operative position relative to the roll;

means for generating a train of pulses of predefined frequency; and means for selectively gating the generated train of pulses in response to the presence of a commanded fixed distance retract or a commanded return of the grinding wheel to its operative position.

18. The system of claim 17 further comprising:

means for defining a binary coded fixed distance in response to said means for commanding a fixed distance retract;

means for comparing the binary coded fixed distance with a binary count of the relative position of the grinding wheel relative to the roll, said comparing means being operative to enable said means for selectively gating the generated train of pulses until the binary coded fixed distance is equal to the binary count of the relative position.

19. The system of claim 18 further comprising:

means for defining a binary one complement of the fixed distance in response to said means for commanding a return of the grinding wheel to its operative position relative to the workpiece; and means for comparing the binary one complement with a binary count of the relative position of the grinding wheel relative to the workpiece, said comparing means being operative to enable said means for selectively gating the generated train of pulses until the binary coded fixed distance is equal to the binary one complement.

20. The system of claim 17 wherein the selectively gated train of pulses generated in response to the presence of a commanded fixed distance retract is applied to said means for generating a second additional infeed positioning signal and wherein the selectively gated train of pulses generated in response to the presence of a commanded return is applied to said means for generating a firstadditional infeed positioning signal.

21. The system of claim 1 further comprising:

means for generating a train of pulses in response to a commanded fixed distance retract operation;

means for counting the generated pulses;

means for comparing the count of the generated pulses with a predetermined binary count;

means for selectively gating the generated pulses in response to the results of the comparison.

22. The system of claim 21 wherein said means for selectively gating the generated pulses comprises:

means for gating the generated pulses through to said means for generating a first additional infeed positioning signal; and means for gating the generated pulses through to said means for generating a second additional infeed positioning signal.

23. The system of claim 1 further comprising:

means for commanding a fixed distance retract of the grinding wheel relative to the roll;

means for generating a first fixed distance signal which is applied to said means for generating a second additional infeed signal;

means for commanding a fixed distance return of the grinding wheel to its original position relative to the roll; and means for generating a second fixed distance signal which is applied to said means for generating a first additional infeed signal.

24. The system of claim 1 further comprising:

means for sensing the load experienced by a motor drive for said grinding wheel;

means for generating an error signal indicative of an error between the sensed load and a predefined load; and means for generating a train of pulses having a frequency which varies as a function of the generated error signal.

25. The system of claim 24 further comprising:

means for detecting the positive or negative status of the error signal; and means for selectively processing the error signal in response to the sensed positive or negative status of the error signal.

26. The system of claim 25 wherein said means for selectively processing the error signal comprises:

means, responsive to the positive or negative status of the error signal, for selectively applying the train of pulses having a frequency proportional to the error signal to either said means for generating a first additional infeed positioning signal or said means for generating a second additional infeed positioning signal.

27. The system of claim 24 wherein the error signal is an analog type of signal and said means for generating a train of pulses is operative to generate a train of pulses having a frequency proportional to the amplitude of the analog error signal.

28. The system of claim 1 further comprising:

means for producing a variable frequency signal wherein the frequency is a function of the load condition experienced by a motor which drives the grinding wheel; and means for selectively applying the variable frequency signal to either said means for generating a first additional infeed positioning signal or said means for generating a second additional infeed positioning signal.

29. The system of claim 28 wherein said means for selectively applying the variable frequency signal comprises:
  means for detecting whether the load condition experienced by the grinding wheel drive motor is greater or less than a predefined load condition; and
  means, responsive to said detecting means for channeling the variable frequency signal to either said means for generating a first additional infeed positioning signal or said means for generating a second additional infeed positioning signal.

30. In a machine wherein a tool is controllably moved toward a workpiece so as to define an engagement with the workpiece, a system for controlling the relative movement of the tool, said system comprising:
  means for commanding an overall predetermined pattern of movement of the tool relative to the workpiece whereby a general pattern is eventually produced on the workpiece;
  means for additionally commanding at least one movement of the tool in an inward direction toward the workpiece;
  means for furthermore additionally commanding at least one movement of the tool in an outward direction relative to the workpiece;
  means for combining the overall pattern of movement commands with the additional inward direction of movement commands, and the additional outward direction of movement commands; and
  means responsive to the combined commands for moving the tool relative to the workpiece.

31. The machine of claim 30 wherein the workpiece comprises a calendar roll and said means for commanding an overall predetermined pattern of movement comprises:
  means for defining a grinding profile along the length of the roll;
  means, responsive to the defining of a grinding profile for selectively producing a first and second train of pulses;
  an analog to digital converter operative to generate a digital value indicative of the grinding profile; and
  means for comparing the digital value indicative of the grinding profile with the number of pulses generated by said means for generating the first and second trains of pulses.

32. The machine of claim 30 wherein said means for furthermore additionally commanding at least one movement of the tool in an inward direction relative to the workpiece comprises:
  means for commanding a plurality of distinct inward movements of the tool relative to the workpiece;
  means, responsive to the commanding of distinct inward movement for producing pulses at predefined frequencies wherein each frequency defines a distinct type of inward movement.

33. The machine of claim 32 wherein said means for furthermore additionally commanding at least one movement of the tool in an outward direction comprises:
  means for commanding a plurality of distinct outward movements of the tool relative to the workpiece;
  means, responsive to the commanding of distinct outward movement for producing pulses at predefined frequencies wherein each frequency defines a distinct type of outward movement.

34. The machine of claim 30 further comprising:
  means for commanding a fixed distance retract of the tool from its operative position relative to the workpiece;
  means for commanding a return of the tool to its operative position relative to the workpiece;
  means for generating a train of pulses of predefined frequency; and
  means for selectively gating the generated train of pulses in response to the presence of a commanded fixed distance retract or a commanded return of the tool to its operative position.

35. The system of claim 34 further comprising:
  means for defining a binary coded fixed distance in response to said means for commanding a fixed distance retract;
  means for comparing the binary coded fixed distance with a binary count of the relative position of the tool relative to the workpiece, said comparing means being operative to enable said means for selectively gating the generated train of pulses until the binary coded fixed distance is equal to the binary count of the relative position.

36. The system of claim 35 further comprising:
  means for defining a binary one complement of the fixed distance in response to said means for commanding a return of the tool to its operative position relative to the workpiece; and
  means for comparing the binary one complement with a binary count of the relative position of the tool relative to the workpiece, said comparing means being operative to enable said means for selectively gating the generated train of pulses until the binary coded fixed distance is equal to the binary one complement.

37. The machine of claim 30 wherein said tool is operatively driven by a motor so as to provide motion for the tool independently of the positioning of the tool relative to the workpiece;
  means for sensing the load experienced by said motor;
  means for generating an error signal indicative of an error between the sensed load and a predefined load; and
  means for generating a train of pulses having a frequency which varies as a function of the generated error signal.

38. The system of claim 37 further comprising:
  means for detecting the positive or negative status of the error signal; and
  means for selectively processing the error signal in response to the sensed positive or negative status of the error signal.

39. A system for defining the infeed of a grinding wheel relative to a workpiece comprising:
  means for selectively commanding a plurality of specific types of infeed motion of the grinding wheel relative to the workpiece, said means for selectively commanding a plurality of specific types of infeed motion comprising:
    means for commanding an overall predetermined pattern of movement of the grinding wheel relative to the workpiece; and
    means for commanding at least one additional movement of the grinding wheel in an inward direction toward the workpiece; and means for commanding at least one additional movement of the grinding wheel in an outward direction relative to the workpiece;

means for generating a plurality of pulse trains having predefined frequencies associated with the specific types of commanded infeed motion; and means for combining the generated plurality of pulse trains into a single set of control signals for controlling s single motorized infeed of the grinding wheel.

40. The system of claim 39 wherein said means for generating a plurality of pulse trains comprises:

means for generating an analog signal defining the amount of infeed along the roll;

means for digitizing the analog signal so as to digitally define the amount of infeed along the roll;

means for comparing the digitally defined amount of infeed with a count of thus far commanded infeed;

means for generating a first train of pulses when the amount of digitally defined infeed is greater than the count of the thus far commanded infeed; and means for generating a second train of pulses when the amount of digitally defined infeed is less than the count of thus far commanded infeed.

41. The system of claim 39 wherein said means for generating a plurality of pulse trains having predefined frequencies associated with specific types of infeed functions comprises:

means for generating at least one train of pulses in response to the commanding of an overall predetermined pattern of movement;

means for generating a train of pulses in response to the commanding of the additional movement of the grinding wheel in an inward direction toward the workpiece; and means for generating a train of pulses in response to the commanding of the additional movement of the grinding wheel in an outward direction relative to the workpiece.

42. The system of claim 41 wherein said means for combining the plurality of pulse trains comprises:

means for combining a first train of pulses generated in response to the commanding of the overall predetermined pattern of movement with one of the trains of pulses generated in response to the commanding of the additional movements.

43. The system of claim 42 wherein said means for combining the plurality of pulse trains further comprises:

means for combining a second train of pulses generated in response to the commanding of the overall predetermined pattern of movement with the other train of pulses generated in response to the commanding of the additional movements.

44. A roll grinding machine having a first positioning system which moves a grinding wheel into operative position relative to a roll so as to engage the roll for the purpose of grinding a profile on the roll, a fixed distance retract positioning system in combination with said first positioning system, said fixed distance retract positioning system being operative to retract said grinding wheel at any time during the grinding of the profile by said first positioning system, said fixed distance retract positioning system comprising:

means for defining a binary coded fixed distance prior to any commanding of a fixed distance retraction;

means for commanding the fixed distance retraction of the grinding wheel at any time during the grinding of the profile by said first positioning system;

means for comparing the defined binary coded fixed distance with a binary count of the commanded fixed distance retraction.

45. The roll grinding machine of claim 44 wherein said fixed distance retract positioning system further comprises:

means for commanding a return of the grinding wheel to its operative position relative to the roll;

means for generating a train of pulses of predefined frequency; and means for selectively gating the generated train of pulses in response to the presence of a commanded fixed distance retract or a commanded return of the grinding wheel to its operative position; and means responsive to the selectively gated train of pulses for positioning the grinding wheel.

46. The roll grinding machine of claim 45 wherein said fixed distance retract positioning system further comprises:

means for defining a binary one complement of the fixed distance in response to said means for commanding a return of the grinding wheel to its operative position relative to the workpiece; and means for comparing the binary one complement with a binary count of the relative position of the grinding wheel relative to the workpiece, said comparing means being operative to enable said means for selectively gating the generated train of pulses until the binary coded fixed distance is equal to the binary one complement.

* * * * *